May 3, 1960   C. H. BRAYBROOK ET AL   2,934,824
APPARATUS FOR MEASURING ANGLES
Filed May 15, 1957   2 Sheets-Sheet 1

INVENTOR.
C. H. BRAYBROOK
C. R. BORLEY
BY
AGENT

United States Patent Office 2,934,824
Patented May 3, 1960

2,934,824

APPARATUS FOR MEASURING ANGLES

Clifford Herbert Braybrook, Horley, and Colin Roderick Borley, Hildonborough, England, assignors to North American Philips Company, Inc., New York, N.Y.

Application May 15, 1957, Serial No. 659,413

Claims priority, application Great Britain May 16, 1956

5 Claims. (Cl. 33—1)

This invention relates to apparatus for measuring angles.

A requirement now exists e.g. in the precision engineering field for apparatus capable of measuring or being set to any angle with an accuracy of the order of ±1 second of arc, which is an accuracy greater than is currently available in the field.

It is an object of the invention to provide improved apparatus for measuring angles which apparatus is capable of considerable accuracy.

The angular measurement of the invention includes the steps of traversing the desired angle at a substantially constant angular velocity, traversing at substantially the same angular velocity a reference angle and comparing the times required to traverse the two angles to obtain a measurement of the desired angle.

Apparatus for measuring angles comprises a rotor, a marker on said rotor, a stationary datum marker adapted to cooperate with the rotor marker, an adjustable marker also adapted to cooperate with said rotor marker and adapted to be located in a stationary position spaced from said datum marker by an arc corresponding to the angle to be measured or determined which angle has its vertex at the axis of rotation of said rotor, means for causing rotation of said rotor at an angular velocity substantially constant at least for any period of one revolution, a pulse generator for generating pulses at a repetition frequency substantially constant at least for any period of one revolution of said rotor, electrical counting means for counting pulses generated by said generator, means for initiating and terminating a first count in response to coincidences between the rotary marker and said datum and adjustable markers, means for initiating and terminating a second count in response to coincidences of at least one marker on said rotor and at least one stationary marker which markers determine a reference angle, and means for comparing such first and second counts and obtaining therefrom a measurement of the desired angle.

An advantage of the invention lies in the fact that neither the angular velocity of the rotor nor the repetition frequency of the pulses need be known accurately or be accurately constant. In fact the ratio of the two counts (which represent two measurements of time) can provide an accurate angular measurement which is independent of changes in rotor speed and/or pulse frequency and changes in the ratio between said speed and frequency provided such changes are sufficiently gradual to be negligible within any period of time equal to or comparable with one revolution.

The pulses may have any desired waveform provided that they can be counted digitally by the counting means employed, and with this proviso they may be rectified cycles or half-cycles of a sine-wave.

The rotor can have a sufficient inertia and sufficiently low damping so as virtually to eliminate irregular changes of velocity within any given revolution or measuring period. For this purpose, it is desirable that the rotor be supported by compressed air bearing means so as to prevent physical contact between the rotary and stationary parts during operation.

The rotor may be driven, for example, in the manner of a turbine, during measurement periods or it may be allowed to run by inertia alone during such periods. Where extreme accuracy is required, the gradual changes of speed associated with free run-down may have to be computed or otherwise taken into account even when they are as small as is the case with a compressed air bearing. However, this necessity can be obviated by directing an air jet at an annular peripheral surface of the rotor for driving the latter. Such rotor surface can be a plain surface without vanes or blades since sufficient torque can thus be obtained together with extreme smoothness and constancy of torque.

The reference angle may be a fixed angle which is maintained constant for differing measured angles, and a particular example of this is provided by the case in which the reference angle is 360°. In such example only two markers are needed for the second count, one on the rotor and one stationary, and such markers may if desired be the rotor and datum markers used for the first count.

Alternatively, the reference angle may be one which varies as the complement of the angle to be measured, both angles being varied simultaneously by any change in the relative position of the datum and adjustable markers. In one example the two complementary angles add up to 360° so that a second count can automatically be initiated on termination of a first count and vice-versa, a total of no more than three markers being required.

The terms "marker" and "cooperating markers" are used herein in a broad sense to denote any means capable of acting rapidly and accurately on a cooperating device to indicate an instant of coincidence therewith, i.e. an instant in which one marker passes another at a predetermined relative position or state of alignment. For example, a rotary marker may be constituted by a sharply localized magnet and a cooperating stationary marker may be provided in the form of a magnetic pick-up head, or alternatively the marker system may be of an electro-optical nature. However, in a preferred arrangement, a rotary marker constituted by a plane reflecting surface on the rotor cooperates with one or more stationary markers each constituted by an auto-collimator. Auto-collimators are available with very high angular resolutions, e.g. of about 0.2 second of arc, and can readily be associated with photoelectric means for controlling the counting means. An advantage of this arrangement lies in the fact that the angular measurements do not depend on the distance between the reflecting marker and the, or each, cooperating auto-collimator marker. In other marker systems in which a sharply localized mark on the rim of the rotor is used, the apparatus will be sensitive to axial misalignment.

The advantages of the use of auto-collimator markers will be explained with the aid of preferred embodiments of the invention. In order that the present invention may be readily carried into effect, it will now be described by way of example with reference to the accompanying drawing, wherein.

Figure 1:
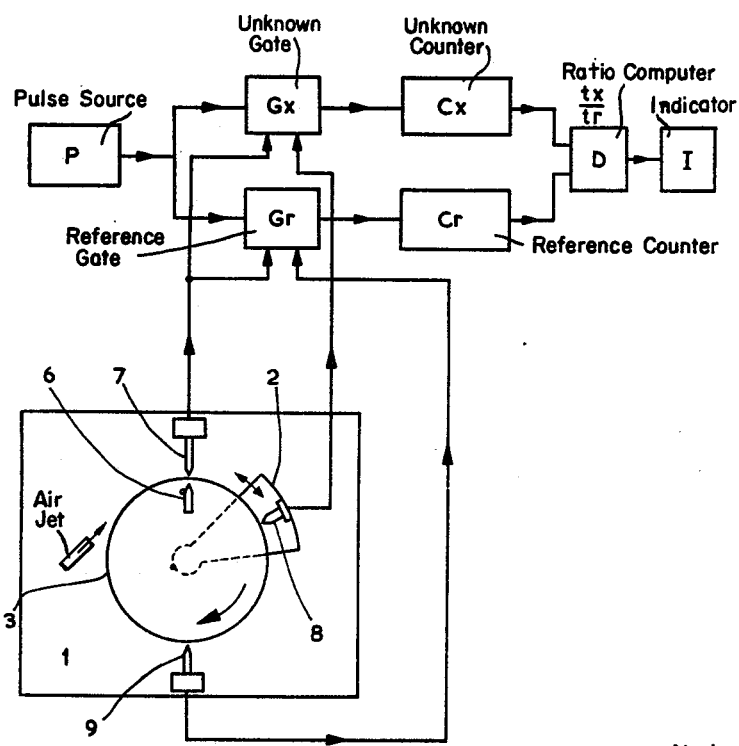
Fig. 1 is a schematic diagram of a preferred embodiment of the apparatus of the present invention.

Referring to the drawing in Fig. 1 the apparatus comprises three main members, a base 1, a table 2 capable of rotary adjustment and a rotor 3 which is coaxial with the axis of adjustment of the table 2. In operation, the rotor 3 turns at a substantially constant angular velocity and, when a marker 6 on the rotor passes a marker 7 on the base, two gates $Gx$, $Gr$ are opened which allow pulses from a pulse source P to be fed respectively into two counters $Cx$, $Cr$. When the same rotor marker passes an adjustable marker 8 on the rotatable table the counter $Cx$ is gated off.

If the reference angle chosen is 180°, the counter $Cr$ may be gated off by a fourth marker 9 as shown but if the reference angle is 360°, gate $Gr$ may be opened and closed by action of the same marker 7.

One revolution contains approximately $1.3 \times 10^6$ seconds of arc so that if the counting rate is of the order of 1 megacycle per second then the angular velocity of the rotor must be about 1 revolution per second.

Of the two counters used, the first counter ($Cx$) measures the time $tx$ taken to traverse the unknown angle $x$ and the other counter ($Cr$) is used to measure the time $tr$ taken to traverse the reference angle, e.g. 360° or 180°, on the base. The unknown angle is given by the ratio $tx/tr$. This involves automatic computation in a unit D and is in principle capable also of making allowance for first order corrections for the decrement of the rotor speed which occurs if the rotor is allowed to run by inertia alone during measurements.

The final computed angular quantity may be displayed by indicating means I and such quantity may be used for control purposes, e.g. in a servo system.

Figure 2:
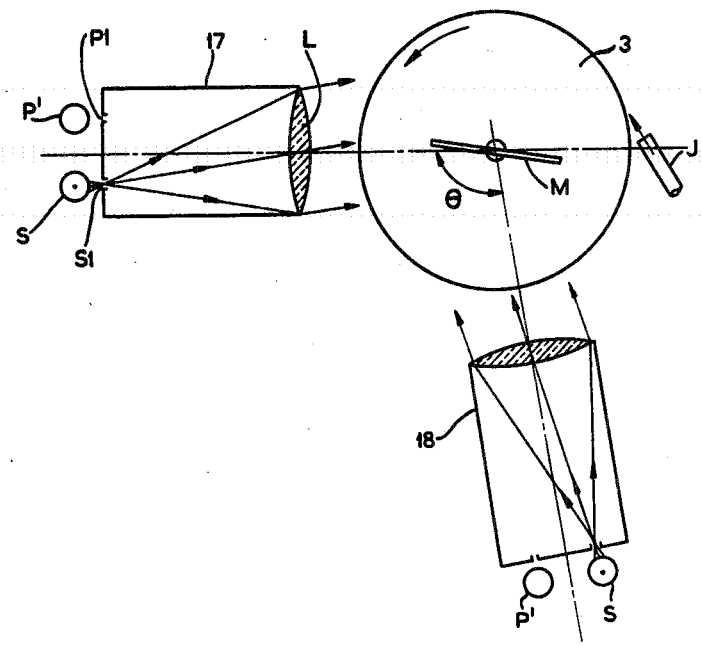
Fig. 2 is a schematic diagram of an embodiment of a marking arrangement which may be utilized with the apparatus of Fig. 1.

Referring now to Fig. 2, there is shown in schematic plan view an arrangement employing a rotor 3 in the form of a disc or wheel carrying a single marker constituted by a plane mirror M. Two stationary auto-collimator markers 17, 18 are arranged to cooperate with different portions of the mirror M (said markers are located at different heights in order to prevent the beam from one auto-collimator from affecting the other).

Figure 3:
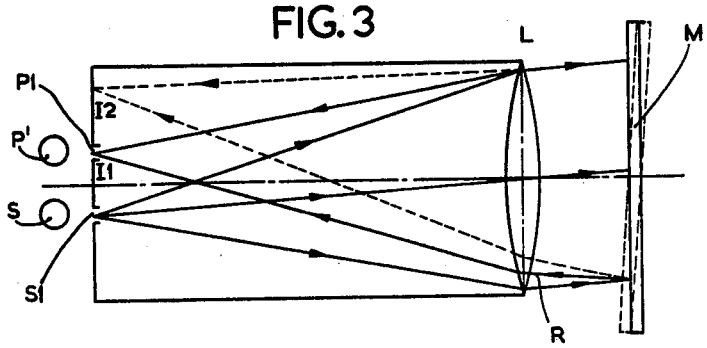
Fig. 3 is a schematic diagram of a portion of the embodiment of Fig. 2 to aid in explaining the operation of such portion.

The operation of each auto-collimator will be explained with reference to Fig. 3. Basically, an auto-collimator is a wide-aperture lens camera focussed for infinity. The rear wall has a slit S1 illuminated from behind by a light source S and a slit P1 having a receiving photocell P' at its rear. Light from source S is formed into a parallel beam after passing through a lens L and can only have its direction changed by a plane mirror M. If mirror M were precisely normal to the parallel beam, the light would retrace its path, coming to a focus again at S1. In Fig. 3, the mirror is shown in two positions, one with the focussed image of the slit S1 upon the cell slit (position I1) and one with said image at I2. As mirror M rotates, the slit image traverses the rear wall of the camera and a pulse is obtained from the photocell as the image crosses slit P1. Therefore, the distance of the mirror M from the auto-collimator does not affect the operation of the device for angular measurement and the device is thus only sensitive to direction. Furthermore, the device is not sensitive to displacement of the mirror in the direction of its plane (as could arise due to play in the bearing of the rotor) so long as the mirror is large enough to receive the beam despite such displacement. Thus, although the operative axes of the auto-collimators have been shown (in Fig. 2) intersecting on the axis of rotation, this is not a necessary condition. As a further consequence, the axis of the rotor need not be accurately coaxial with the axis about which the movable auto-collimator is adjusted. Moreover, although the plane of the reflecting surface of mirror M is shown in Fig. 2 so located as to contain the axis of rotation, the mirror surface may be displaced from said axis and/or tilted in relation thereto by an angle of a few degrees; such tilt will not materially affect the accuracy of measurement provided that each auto-collimator is appropriately aligned.

Figure 4:
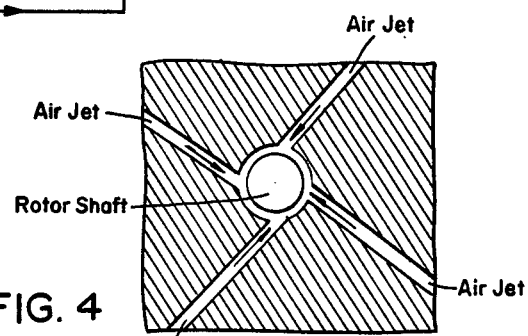
Fig. 4 is a schematic diagram of an embodiment of compressed air bearing means.

In Fig. 2 an air jet J is shown directed at a plain annular surface of the rotor 3 for driving said rotor, and the said rotor is supported entirely by compressed air bearing means. Suitable compressed air bearing means are shown in Fig. 4.

While the invention has been described by means of a specific example and in a specific embodiment, we do not wish to be limited thereto, for obvious modifications will occur to those skilled in the art without departing from the spirit and scope of the invention.

What is claimed is:

1. Apparatus for measuring angles comprising a rotor, a marker on said rotor, a stationary marker adapted to cooperate with the rotor marker, an adjustable marker also adapted to cooperate with said rotor marker and adapted to be located in a stationary position spaced from said stationary marker by an arc corresponding to the angle to be measured or determined which angle has its vertex at the axis of rotation of said rotor, means for causing rotation of said rotor at an angular velocity substantially constant at least for any period of one revolution, a pulse generator for generating pulses at a repetition frequency substantially constant at least for any period of one revolution of said rotor, electrical counting means for counting pulses generated by said generator, means for initiating and terminating a first count in response to coincidences between the rotary marker and said stationary and adjustable markers, means for initiating and terminating a second count in response to coincidences of at least one marker on said rotor and at least said stationary marker which markers determine a reference angle, and means for comparing such first and second counts and obtaining therefrom a measurement of the desired angle.

2. Apparatus for measuring angles comprising a rotor, a marker on said rotor comprising a plane mirror, a stationary marker adapted to cooperate with the rotor marker, said stationary marker comprising an auto-collimator adapted to cooperate with said mirror, an adjustable marker also adapted to cooperate with said rotor marker and adapted to be located in a stationary position spaced from said stationary marker by an arc corresponding to the angle to be measured or determined which angle has its vertex at the axis of rotation of said rotor, means for causing rotation of said rotor at an angular velocity substantially constant at least for any period of one revolution, a pulse generator for generating pulses at a repetition frequency substantially constant at least for any period of one revolution of said rotor, electrical counting means for counting pulses generated by said generator, means for initiating and terminating a first count in response to coincidences between the rotary marker and said stationary and adjustable markers, means for initiating and terminating a second count in response to coincidences of at least one marker on said rotor and at least said stationary marker which markers determine a reference angle, and means for comparing such first and second counts and obtaining therefrom a measurement of the desired angle.

3. Apparatus for measuring angles comprising a rotor, a marker on said rotor, a stationary marker adapted to cooperate with the rotor marker, an adjustable marker also adapted to cooperate with said rotor marker and adapted to be located in a stationary position spaced from said stationary marker by an arc corresponding to the angle to be measured or determined which angle has its vertex at the axis of rotation of said rotor, means for causing rotation of said rotor at an angular velocity substantially constant at least for any period of one revolution, said rotation causing means comprising means for directing an air jet at an annular peripheral surface of said rotor, a pulse generator for generating pulses at a repetition frequency substantially constant at least for any period of one revolution of said rotor, electrical counting means for counting pulses generated by said generator, means for initiating and terminating a first count in response to coincidences between the rotary marker and said stationary and adjustable markers, means for initiating and terminating a second count in response to coincidences of at least one marker on said rotor and at least said stationary marker which markers determine a reference angle, and means for comparing such first and second counts and obtaining therefrom a measurement of the desired angle.

4. Apparatus for measuring angles comprising a rotor, a marker on said rotor, a stationary marker adapted to cooperate with the rotor marker, an adjustable marker also adapted to cooperate with said rotor marker and adapted to be located in a stationary position spaced from said stationary marker by an arc corresponding to the angle to be measured or determined which angle has its vertex at the axis of rotation of said rotor, compressed air bearing means supporting said rotor, means for causing rotation of said rotor at an angular velocity substantially constant at least for any period of one revolution, a pulse generator for generating pulses at a repetition frequency substantially constant at least for any period of one revolution of said rotor, electrical counting means for counting pulses generated by said generator, means for initiating and terminating a first count in response to coincidences between the rotary marker and said stationary and adjustable markers, means for initiating and terminating a second count in response to coincidences of at least one marker on said rotor and at least said stationary marker which markers determine a reference angle, and means for comparing such first and second counts and obtaining therefrom a measurement of the desired angle.

5. Apparatus for measuring angles comprising a rotor, a marker on said rotor comprising a plane mirror, a stationary marker adapted to cooperate with the rotor marker, said stationary marker comprising an auto-collimator adapted to cooperate with said mirror, an adjustable marker also adapted to cooperate with said rotor marker and adapted to be located in a stationary position spaced from said stationary marker by an arc corresponding to the angle to be measured or determined which angle has its vertex at the axis of rotation of said rotor, compressed air bearing means supporting said rotor, means for causing rotation of said rotor at an angular velocity substantially constant at least for any period of one revolution, said rotation causing means comprising means for directing an air jet at an annular peripheral surface of said rotor, a pulse generator for generating pulses at a repetition frequency substantially constant at least for any period of one revolution of said rotor, electrical counting means for counting pulses generated by said generator, means for initiating and terminating a first count in response to coincidences between the rotary marker and said stationary and adjustable markers, means for initiating and terminating a second count in response to coincidences of at least one marker on said rotor and at least said stationary marker which markers determine a reference angle, and means for comparing such first and second counts and obtaining therefrom a measurement of the desired angle.

References Cited in the file of this patent

UNITED STATES PATENTS

| | | |
|---|---|---|
| 2,046,005 | Sprecker | June 30, 1936 |
| 2,249,373 | Alkan | July 15, 1941 |
| 2,433,385 | Miller | Dec. 30, 1947 |
| 2,688,805 | Annen | Sept. 14, 1954 |
| 2,730,698 | Daniels et al. | Jan. 10, 1956 |
| 2,734,188 | Jacobs | Feb. 7, 1956 |